United States Patent [19]

Rauner

[11] Patent Number: 5,517,413

[45] Date of Patent: May 14, 1996

[54] ACTIVE REAR AXLE KINEMATICS OF A MOTOR VEHICLE ALSO STEERED AT THE REAR WHEELS THEREOF

[75] Inventor: Hans Rauner, Nittenau, Germany

[73] Assignee: Siemens Aktiengesellschaft, Munich, Germany

[21] Appl. No.: 623,932

[22] PCT Filed: Oct. 5, 1988

[86] PCT No.: PCT/DE88/00613

§ 371 Date: Feb. 6, 1991

§ 102(e) Date: Feb. 6, 1991

[87] PCT Pub. No.: WO89/11992

PCT Pub. Date: Dec. 14, 1989

[30] Foreign Application Priority Data

Jun. 10, 1988 [DE] Germany .............. 38 19 849.5

[51] Int. Cl.⁶ .................. B62D 7/14; B62D 5/04
[52] U.S. Cl. .................. 364/424.05; 180/79.1; 180/140; 280/91
[58] Field of Search .............. 364/424.01, 424.05; 180/79.1, 140, 141, 142, 143; 280/91

[56] References Cited

U.S. PATENT DOCUMENTS

| | | | |
|---|---|---|---|
| 4,679,809 | 7/1987 | Ito et al. | 280/91 |
| 4,770,265 | 9/1988 | Allen | 180/140 |
| 4,773,012 | 9/1988 | Ito et al. | 364/424.01 |
| 4,786,065 | 11/1988 | Donges et al. | 280/91 |
| 4,828,061 | 5/1989 | Kimbrough et al. | 180/79.1 |
| 4,842,089 | 6/1989 | Kimbrough et al. | 180/79.1 |
| 4,884,647 | 12/1989 | Mimuro et al. | 180/140 |
| 4,942,532 | 7/1990 | Mori et al. | 364/424.05 |
| 4,947,326 | 8/1990 | Mori et al. | 364/424.04 |

FOREIGN PATENT DOCUMENTS

| | | |
|---|---|---|
| 3525543A1 | 1/1986 | Germany . |
| 3624457A1 | 1/1988 | Germany . |

OTHER PUBLICATIONS

Oppenheim/Schafer: *Digital Signal Processing*, Prentice-Hall, Inc., Englewood Cliffs, 1975, pp. 10–19, 148–151, and 196–205.

Rabiner and Gold: *Theory and Application of Digital Signal Processing*, Prentice–Hall, Inc., Englewood Cliffs, N.J., pp. 8–75. No date.

*Primary Examiner*—Collin W. Park
*Attorney, Agent, or Firm*—Hill, Steadman & Simpson

[57] ABSTRACT

Process-computer-controlled, active rear axle kinematics of a motor vehicle also steered at the rear wheels with an electronically controlled control element, provides that the process computer considers the respective steering angle of the front axle and/or values that can be derived therefrom, a potentially speed-dependent derivative action time constant, a potentially speed-dependent delayed time constant, and a potentially speed-dependent co-steering factor for the automatic control of the rear wheels, and the process computer processes parameters acquired from samples, these parameters correlating at least with those angles, only according to a difference equation—i.e., not according to a differential equation to be iteratively solved—and outputs the rated values acquired as a result thereof for the rear axle or, respectively, rear wheel steering angle and/or rated values derived therefrom to the control element.

4 Claims, 2 Drawing Sheets

ACTIVE REAR AXLE KINEMATICS OF A MOTOR VEHICLE ALSO STEERED AT THE REAR WHEELS THEREOF

BACKGROUND OF THE INVENTION

1. Field of the Invention

The invention is directed to an active rear axle kinematics disclosed by German published application 36 24 457 and in corresponding U.S. Pat. No. 4,785,065 for a motor vehicle also steered at the rear wheels thereof, whereby the rear wheel steering angle or angles are set by an electronically controlled actuator according to rated values for the rear wheel steering angle or angles or, respectively, rated values which can be derived therefrom whereby these rated values, or respectively, the rear wheel steering angles are calculated at least from

- sampled values for the respective front axle steering angle and/or values which can be derived therefrom,
- a potentially speed-dependent derivative action time constant,
- a potentially speed-dependent delay time constant, and
- a potentially speed-dependent co-steering factor.

2. Description of the Related Art

In the known rear axle kinematics, a differential equation is solved with a process computer for calculating the rear axle steering angle. Such digital equations can usually be solved by iterative methods on the basis of digital, i.e., non-analog methods. The problem thereby derives that the solution is solved with adequate precision only after a plurality of iteration steps—this plurality being still unknown at the beginning of the calculation. In situations wherein one must react quickly, this means that the computer no longer finds a result in time or, respectively, that one must count on imprecise solutions dependent on how many iteration steps were capable of being carried out.

In an automobile, this can lead to problems precisely in dangerous situations when abrupt steering is carried out. The iterative solution of a differential equation also requires a relatively high memory requirement for the process computer.

SUMMARY OF THE INVENTION

The object of the invention is

- to enable a precise solution despite an extremely short calculating time, as well as
- to be able to reduce the computational outlay in the process computer and, as a result hereof, to also be able to reduce the memory requirement of this process computer. This object is achieved by the a digital filter is provided for the purpose of determining the rated values for the rear axle steering angle or angles, the digital filter being dimensioned according to a difference equation, whereby the difference equation, in turn, corresponds to a differential equation for the steering kinematics while satisfying Shannon's sampling theorem.

Insofar as a process computer hitherto thereby works according to an iterative method, it can be reprogrammed such, as shall be shown later, with the z-transformation of the invention that it subsequently works only according to difference equations that correspond to the differential equations.

Fundamentally, the originally given differential equation can nonetheless be complicated, for example—as is often standard in differential equations—can also contain terms of a higher order and many parameters, for example in order to further improve the control ease or the reliability in extreme situations. The result can nonetheless be very quickly and precisely calculated with the invention. Thus, for example, the respective steering angle of the rear axle or, respectively, rear wheels can also be co-considered. Likewise, a complicated dependency—for example, speed dependency—of the as—steering factor and of the two constants, for example, the derivative action time constant and the delay time constant can be co-considered.

BRIEF DESCRIPTION OF THE DRAWINGS

The new functioning of the process computer becomes easier to understand when the mathematical foundations are discussed in conjunction with drawings, including.

DETAILED DESCRIPTION OF THE PREFERRED EMBODIMENTS

Figure 1:
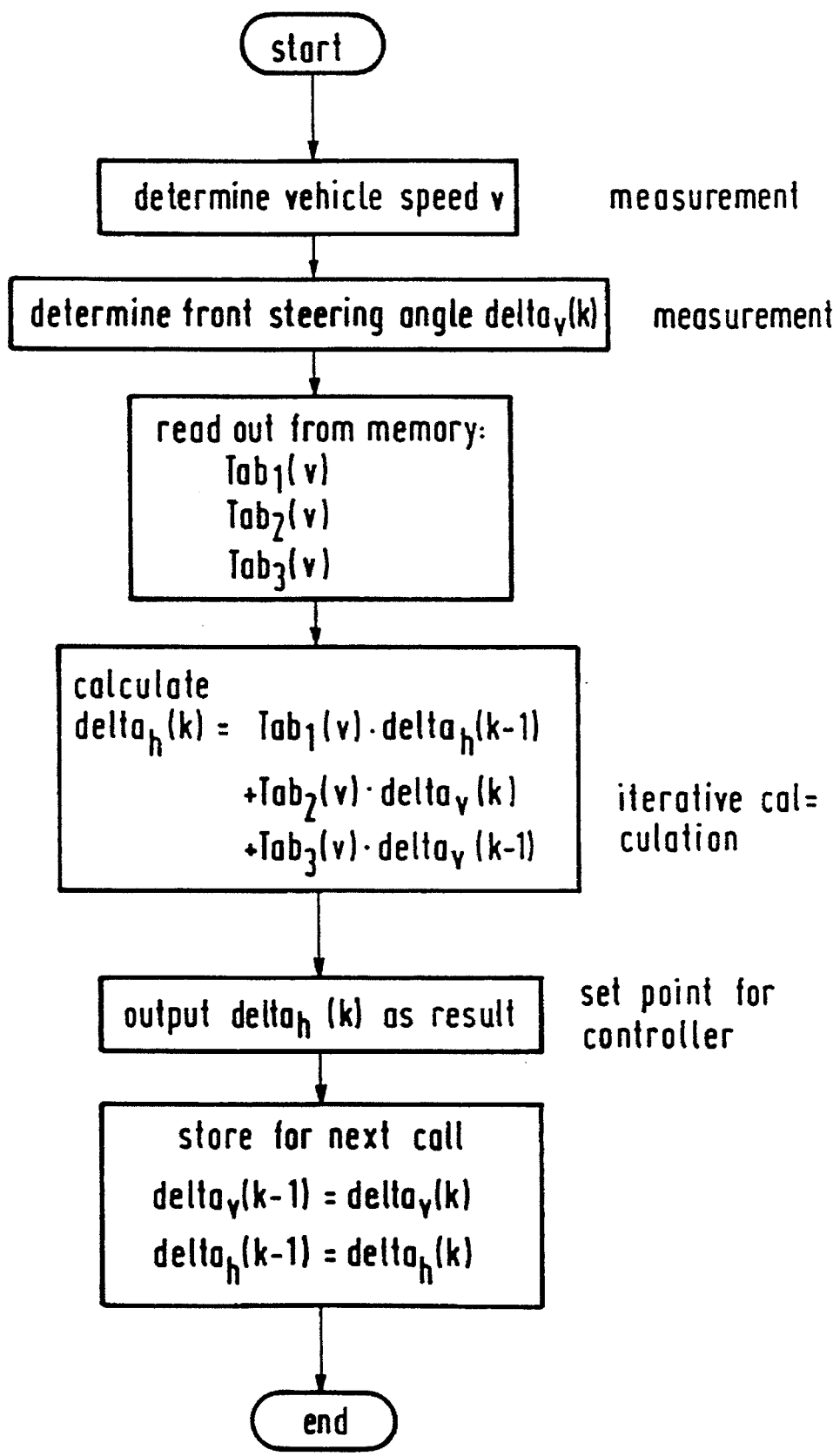
FIG. 1 is a flow diagram showing a process of sampling time calculations according to the present invention.

With reference to FIG. 1, the process computer, for example, has the job of driving the actuator for the rear axle according to the following algorithm, i.e. according to a differential equation, on the basis of the position of the steering angle, of the steering angle speed and of the vehicle speed (see FIG. 1, the second block):

$$T1 \cdot \dot{\delta}_h(t) + \delta_h(t) = PHA \cdot (\delta_v(t) + TD \cdot \dot{\delta}_v(t))$$

wherein $67_h$=steering angle of the rear axle and $67_v$=steering angle of the front axle (see FIG. 1, the third block) whereby "$\delta$" shall be referred to below as "delta", "$\dot{\delta}$" shall be referred to as "ddelta" (and "$\Delta$" shall be referred to as "Delta").

The co-steering factor PHA, the derivative action time constant TD and the delay time constant T1 can thereby even be speed-dependent parameters and, for example, can be represented by characteristics—or, respectively, by corresponding tables stored in a memory, stored as defined, characteristic, individual values between which interpolation can also be undertaken as needed. The process computer of the invention, moreover, can be designed such that a modification of the characteristics is even possible by subsequent modification of the stored values of these tables (Tab$_1$, Tab$_2$, Tab$_3$)(see FIG. 1, the fourth block). For example, 100 values are stored for a table PHA concerning the speed, 10 respective values, for example, are stored for the tables TD and T1 concerning the speed. The step size between the values in the PHA table amounts, for example, to 2.5 km/h, amounting, for example, to respectively 25 km/h in the tables TD and T1. The lower value, for example, is valid within the step size in case interpolation is not carried out.

The calculation, for example, can ensue according to the following equation:

$$\text{delta}_h = \text{Delta } t \cdot (-1/T_1 \cdot \text{delta}_h(t\text{-Delta}) + 1/T_1 \cdot PHA(\text{delta}_v(t) + \text{delta}_v(t) \cdot TD)) + \text{delta}_h(t\text{-Delta } t),$$

which—however! —represents an iterative method of approximation. The remaining steps in the process are shown in FIG. 1, blocks 5–8. The equation of block 5 is derived hereinafter.

The invention makes it possible to avoid having to solve the above differential equation in complicated fashion with an iterative method of approximation in accord, for example, with the above and with high time outlay in order to control the angle of the rear axle or, respectively, of the rear wheels with the found solution. Moreover, the invention quickly calculates precise solutions instead of approximate solutions, for which reason the invention quickly and precisely steers the rear wheels.

The invention calculates the solution not directly from the differential equation according to an iterative method of approximation. On the contrary, the differential equation is first converted into a difference equation since the appertaining rear axle kinematics does not involve a chronologically continuous system but a sampled system of discrete values in time. To this end, the appertaining z-transfer function of an equivalent filter is first calculated from the differential equation with a z-transformation, whereby this z-transfer function contains one or more characteristic pole locations and zero positions. That difference equation that the processor must inventively handle is calculated therefrom—with which, thus, the processor is to be inventively programmed. This difference equation thus corresponds to the original differential equation (at least when Shannon's sampling theorem is observed) and, so to speak, describes a digital filter that supplies the solution of the differential equation even though a difference equation is used for the calculation. This filter thus has a characteristic that delivers the exact solution of the differential equation for the sampled system.

Figure 2:
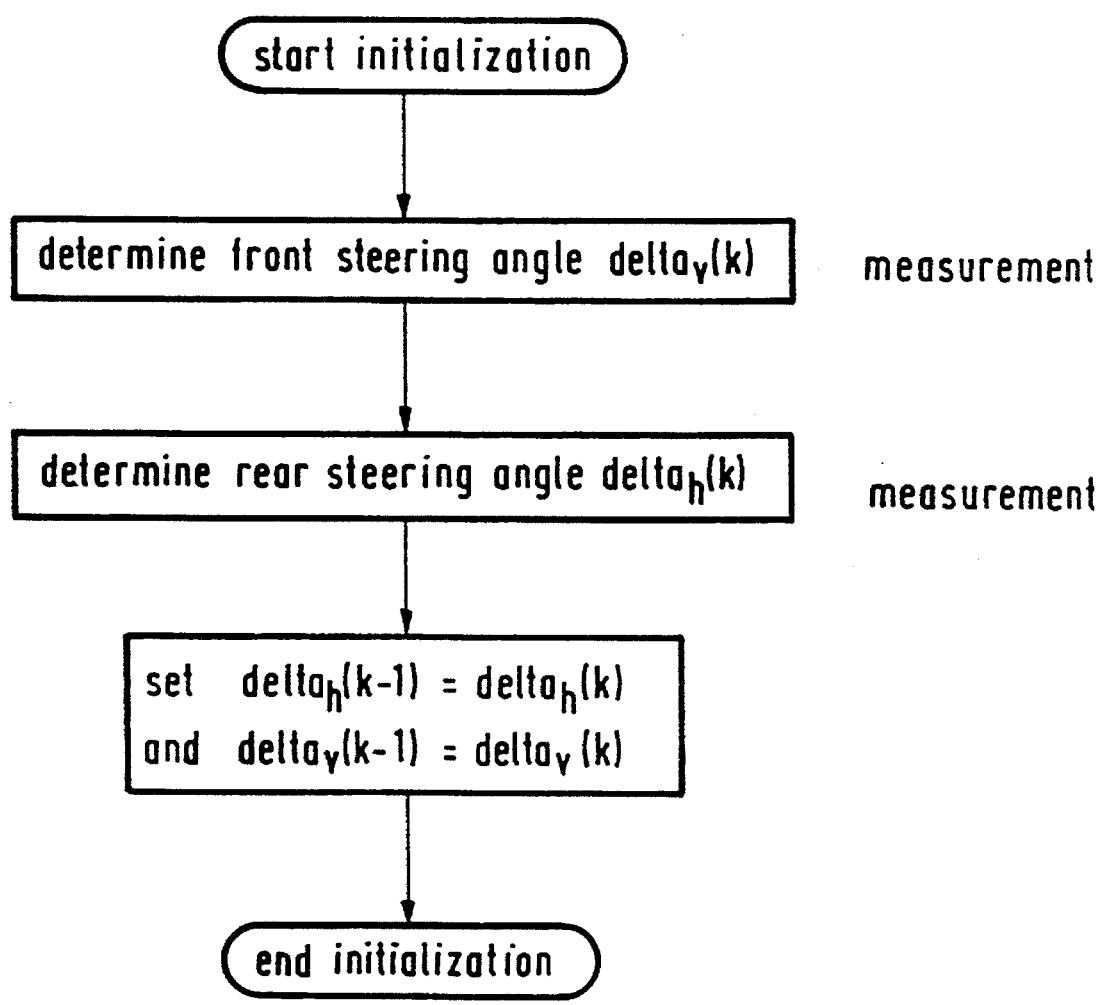
FIG. 2 is a flow diagram showing a process of initialization according to the invention.

A concrete example relating thereto: in the case of the above-considered rear axle kinematics, what is involved, so to speak, is a recursive filter of the first order that can be realized in canonic structure, i.e. with a minimum number of memory elements. The required filter characteristic or, respectively, the algorithm to be processed by the process computer derives from the following derivation of the inventive, fast variant for solving the differential equation in the case of sampled systems (the sampling period T thereby amounts, for example, to 10 ms; also see, for example, the textbooks Oppenheim/Schafer: Digital Signal Processing. Englewood Cliffs 1975; as well as Rabiner/Gold: Theory and Application of Digital Signal Processing, Englewood Cliffs, 1975):

The initial condition of a digital filter that is described by the difference equation derived from the differential equation is calculated as shown in FIG. 2.

The differential equation can first be rewritten into the general form $$A \cdot y^1(t) + (t) = B[x(t) + Cx^1(t)]$$

Wherein

A:=T1 y:=delta$_h$ (rear axle)

B:=PHA x:=delta$_v$ (front axle)

C:=TD

Converting to time into discrete values yields a difference equation wherein $t = k \cdot T$ and $T$ = sampling interval $$A\left(\frac{y(k) - y(k-1)}{T}\right) + y(k) = B\left[x(k) + c\left(\frac{x(k) - x(k-1)}{T}\right)\right]$$

resp.

$$\frac{A}{T}[y(k) - y(k-1)] + y(k) = Bx(k) + \frac{BC}{T}[x(k) - x(k-1)]$$

After a z-transformation, $$\frac{A}{T}[Y(z) - Y(z)z^{-1}] + Y(z) = B \cdot X(z) + \frac{BC}{T}[X(z) - X(z)z^{-1}]$$

is obtained. The following x-transfer function then derives:

$$\frac{Y(z)}{X(z)} = \frac{B\left[1 + \frac{C}{T}(1 - z^{-1})\right]}{\left[1 + \frac{A}{T}(1 - z^{-1})\right]}$$

and, thereby specifically:

$$\frac{\text{Delta}_h(z)}{\text{Delta}_v(z)} = \frac{PHA \cdot \left[1 + \frac{TD}{T}(1 - z^{-1})\right]}{\left[1 + \frac{T1}{T}(1 - z^{-1})\right]}$$

having the zero location:

$z_0 = 1/(1 + T/TD)$ and having the pole location:

$z_{00} = 1/(1 + T/T1)$

What is thus involved is a stable system since T1 >0 (pole lies within the circle with radius).

The solution of the difference equation with a digital filter thus corresponds to $$y(k) = \frac{A}{A+T} y(k-1) + \frac{B(C+T)}{A+T} x(k) - \frac{BC}{A+T} x(k-1)$$

specifically:

$$\text{Delta}_h(k) = \frac{T1}{T1+T} \text{Delta}_h(k-1) +$$

$$\frac{PHA(TD+T)}{T1+T} \text{Delta}_v(k) - \frac{PHA \cdot TD}{T1+T} \text{Delta}_v(k-1)$$

with PHA, T1, TD as functions of v, i.e., dependent on the motor vehicle speed, the following difference equation (as shown in FIG. 1, block 5) derives:

Delta$_h$(k)=Tab$_1$(v)·Delta$_h$(k–1)+Tab$_2$(v)·Delta$_v$(k)++ Tab$_3$(v)·Delta$_v$(k–1)

wherein $$\text{Tab}_1(v) = \frac{T1(v)}{T1(v) + T}$$

$$\text{Tab}_2(v) = PHA(v) \frac{T + TD(v)}{T1(v) + T}$$

$$\text{Tab}_3(v) = -PHA(v) \frac{TD(v)}{T1(v) + T}$$

In order to solve this difference equation derived from the differential equation, only three multiplications as well as two additions per cycle/sampling period are now required instead of the protracted iterative calculating methods that only supply imprecise results. This operation of the process computer therefore offers the following advantages:

exact solutions instead of approximations fewer computational operations (no division!)

fewer memory operations exploitation of the known properties of digital filters, for example with respect to stability, numerics, etc.

facilitated realization in fixed point arithmetic, for the reduction of computational and memory operations as a result thereof, as well as especially low memory requirements for code and data or, respectively, tables; for example, a halving of the memory requirements for the tables $Tab_1(v)$, $Tab_2(v)$ and $Tab_3(v)$ is often admissible or, respectively, allowable without deteriorating the operation of the rear axle kinematics—by comparison to the operation thereof on the basis of the solution of the differential equation with iterative approximation.

This derivation example also shows that the process computer can also be referred to as a digital filter that is dimensioned according to the differential equations, whereby the said advantages are preserved.

Although other modifications and changes may be suggested by those skilled in the art, it is the intention of the inventors to embody within the patent warranted hereon all changes and modifications as reasonably and properly come within the scope of their contribution to the art.

I claim:

1. Method of controlling a rear wheel steering angle for a motor vehicle also steered at the rear wheels thereof, comprising:

controlling a rear wheel steering angle by an electronically controlled actuating member according to rated values for the rear wheel steering angle, calculating the rated values from
sampled values for a front axle steering angle,
a derivative action time constant,
a delay time constant, and
a co-steering factor, using a digital filter for calculating the rated values for the rear wheel steering angle, said digital filter being dimensioned according to a difference equation, said difference equation, in turn, corresponding to a differential equation for steering kinematics while satisfying Shannon's sampling theorem.

2. Method of controlling a rear wheel steering angle according to claim 1, wherein the digital filter comprises a correspondingly programmed process computer.

3. Method of controlling a rear wheel steering angle according to patent claim 1, further comprising:

inputting said rear wheel steering angle to the digital filter.

4. Method of controlling a rear wheel steering angle according to patent claim 1, further comprising:

storing time-dependent discrete values for the derivative action time constant, for the delay time constant, and for the co-steering factor as a table in a memory in a non-linear way.

* * * * *